United States Patent
Liuzzo et al.

(10) Patent No.: US 12,153,654 B2
(45) Date of Patent: *Nov. 26, 2024

(54) USER-SPECIFIC WATERMARK FOR MAINTAINING SECURITY OF DATA FILES

(71) Applicant: Bank of America Corporation, Charlotte, NC (US)

(72) Inventors: Elizabeth R. Liuzzo, Charlotte, NC (US); Jennifer Walsh, Fort Mill, SC (US); Christopher J. Stott, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/225,425

(22) Filed: Jul. 24, 2023

(65) Prior Publication Data

US 2024/0004971 A1   Jan. 4, 2024

Related U.S. Application Data

(63) Continuation of application No. 17/664,923, filed on May 25, 2022, now Pat. No. 11,755,695, which is a continuation of application No. 16/405,163, filed on May 7, 2019, now Pat. No. 11,403,374.

(51) Int. Cl.
| | |
|---|---|
| *G06F 21/16* | (2013.01) |
| *G06F 21/62* | (2013.01) |
| *G06N 20/00* | (2019.01) |
| *G06Q 50/00* | (2012.01) |

(52) U.S. Cl.
CPC .......... *G06F 21/16* (2013.01); *G06F 21/6209* (2013.01); *G06N 20/00* (2019.01); *G06Q 50/01* (2013.01)

(58) Field of Classification Search
CPC ...... G06F 21/16; G06F 21/6209; G06Q 50/01
See application file for complete search history.

(56) References Cited

U.S. PATENT DOCUMENTS

| | | | |
|---|---|---|---|
| 1,016,955 | A | 2/1912 | Psareas |
| 6,101,602 | A | 8/2000 | Fridrich |
| 6,915,481 | B1 | 7/2005 | Tewfik et al. |
| 7,756,892 | B2 | 7/2010 | Levy |

(Continued)

*Primary Examiner* — Thaddeus J Plecha
(74) *Attorney, Agent, or Firm* — Banner & Witcoff, Ltd.

(57) ABSTRACT

Aspects of the disclosure relate to multicomputer processing and dissemination of data files. A computing platform having at least one processor, a memory, and a communication interface may search one or more social media platforms for unauthorized dissemination of a data file. The computing platform may correlate a unique identifying feature(s) of the disseminated data file to that of a copy of the data file previously distributed to a linked user account. The computing platform may transmit, via the communication interface, to an administrative computing device, an unauthorized dissemination report which, when processed by the administrative computing device causes a notification to be displayed on the administrative computing device. The notification may identify the linked user account associated with the unauthorized dissemination, the name, content, or general nature of the data file, and/or the social media platform(s) on which the data file was discovered.

20 Claims, 6 Drawing Sheets

(56) References Cited

U.S. PATENT DOCUMENTS

| | | |
|---|---|---|
| 7,760,903 B2 | 7/2010 | Pullen et al. |
| 7,864,186 B2 | 1/2011 | Robotham et al. |
| 7,894,630 B2 | 2/2011 | Pullen et al. |
| 8,099,403 B2 | 1/2012 | Levy |
| 8,131,760 B2 | 3/2012 | Levy |
| 9,197,628 B1 | 11/2015 | Hastings |
| 9,607,134 B2 | 3/2017 | Dulkin et al. |
| 9,665,723 B2 | 5/2017 | Dabbiere et al. |
| 9,699,193 B2 | 7/2017 | Marshall |
| 9,760,818 B2 | 9/2017 | Asthana et al. |
| 9,978,112 B2 | 5/2018 | Poder et al. |
| 10,157,437 B2 | 12/2018 | Poder et al. |
| 10,169,552 B2 | 1/2019 | Huang et al. |
| 11,403,374 B2 * | 8/2022 | Liuzzo .................. G06N 20/00 |
| 11,755,695 B2 * | 9/2023 | Liuzzo .................. G06F 21/16 |
| | | 713/176 |
| 2013/0007890 A1 | 1/2013 | De Laat et al. |
| 2014/0007246 A1 | 1/2014 | Nelson et al. |
| 2014/0137238 A1 | 5/2014 | Brdiczka et al. |
| 2014/0165137 A1 | 6/2014 | Balinsky et al. |
| 2016/0080397 A1 | 3/2016 | Bacastow et al. |
| 2017/0134344 A1 | 5/2017 | Wu et al. |
| 2019/0182258 A1 * | 6/2019 | Yoon .................... H04L 51/212 |
| 2021/0200891 A1 | 7/2021 | Welch et al. |

* cited by examiner

UNAUTHORIZED DISSEMINATION ALERT — 410

A copy of company confidential [DataFile1] was discovered on [SocialMedia1] platform. From a security feature embedded into the data file, we determined that the unauthorized copy was originally distributed to [User1] of [Organization1]

FIG. 4A

USER ACCESS RESTRICTED — 420

We discovered that [User1] of [Organization1] posted company confidential [DataFile1] on [SocialMedia1] platform. We have blocked [User1] from receiving further access to company confidential documents.

FIG. 4B

USER-SPECIFIC WATERMARK FOR MAINTAINING SECURITY OF DATA FILES

CROSS REFERENCE TO RELATED APPLICATIONS

This application is a continuation of application Ser. No. 17/664,923 entitled "User-specific Watermark for Maintaining Security of Data Files" filed May 25, 2022 which is a continuation of application Ser. No. 16/405,163 entitled "User-specific Watermark for Maintaining Security of Data Files" filed on May 7, 2019, both of which are hereby incorporated by reference in their entirety.

BACKGROUND

Aspects of the disclosure relate to electrical computers, digital processing systems, and multicomputer data transferring. In particular, one or more aspects of the disclosure relate to maintaining security of restricted-access data files disseminated to a plurality of user devices.

As computer systems are increasingly utilized to provide automated and electronic services, such computer systems may obtain and maintain increasing amounts of various types of sensitive information. There is continual need to ensure the safety and security of transmitted information. There is an omnipresent need for minimizing risk of unauthorized dissemination of sensitive information.

SUMMARY

Aspects of the disclosure provide effective, efficient, scalable, and convenient technical solutions that address and overcome the technical problems associated with providing information security and optimizing the efficient and effective technical operations of computer systems. In particular, one or more aspects of the disclosure provide techniques for improving information security and enhancing technical performance of computing systems.

In accordance with one or more embodiments, a computing platform having at least one processor, a memory, and a communication interface may search one or more social media platforms for unauthorized dissemination of a data file. Upon identifying an unauthorized dissemination of a data file, the computing platform may correlate a unique identifying feature(s) of the data file to that of a copy of the data file that was previously distributed to a linked user account. The computing platform then may transmit, via the communication interface, to an administrative computing device, an unauthorized dissemination report which, when processed by the administrative computing device causes a notification to be displayed on the administrative computing device. The notification may identify such information as the linked user account associated with the unauthorized dissemination; the name, content, or general nature of the data file; and/or the social media platform(s) on which the data file was discovered.

In some embodiments, the data file may comprise image (s) captured on a client computing device, such as a photograph of a document containing text and/or drawings, that were uploaded to the social media platform(s). If the photographed document contains text, the computing platform may execute an optical character recognition (OCR) program to evaluate the content of the document and/or the unique identifying feature(s) embedded into the data file.

In some embodiments, the memory may store additional computer-readable instructions that, when executed by the at least one processor, cause the computing platform to receive, via the communication interface, a restricted-access data file for distribution to a plurality of linked user accounts. In some examples, the data file may be tagged as a restricted-access file. The computing platform may embed a unique identifying feature into a copy of the data file for distribution to each of the plurality of linked user accounts, and then transmit to each of a plurality of linked user devices, a copy of the data file containing the identifying feature unique to the respective linked user account. This way, if a linked user disseminates his or her copy of the restricted-access data file on a social media platform, the computing platform subsequently can identify, based on the unique identifying feature, the particular user account associated with the illicitly disseminated data file copy.

In some embodiments, the memory may store additional computer-readable instructions that, when executed by the at least one processor, cause the computing platform to receive, via the communication interface, a data file for distribution to a plurality of linked user accounts. The computing platform may compare the data file to a machine learning dataset and/or business rules to assess whether the data file contains restricted-access information. Upon determining that the data file contains restricted-access information, the computing platform may embed an identifying feature into a copy of the data file for distribution to each of the plurality of linked user accounts. The computing platform may transmit, via the communication interface, to each of a plurality of linked user devices, a copy of the data file containing the identifying feature unique to the respective linked user account.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 4A and 4B depict example graphical user interfaces for administrative computing devices in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Business organizations from time to time share sensitive information with individuals in other business organizations. Even when a nondisclosure agreement is in place, there remains a risk of unauthorized disclosure of sensitive information. When a business organization disseminates a sensitive document to a large number of recipients, for example, one of the recipients may "leak" the document on social media, with little fear of repercussions on the belief that the business organization has no way of knowing which one of the large number of recipients was responsible for the unauthorized disclosure. In accordance with one or more aspects disclosed herein, data files distributed to a plurality of users may each contain a unique identifying feature (e.g., user-specific "watermark") that enables an enterprise organization to correlate a potential "leaked" copy of the data file to a particular user who received the data file. In some examples, the unique identifying feature is invisible to the naked eye. For example, the font of a single character in a document may be altered, spacing between two words may be altered, and/or other subtle changes may be made so that the unique identifying feature is entirely unapparent to the user. Having the unique identifying feature invisible to the naked eye enhances security by minimizing the risk that even a sophisticated user will obfuscate the unique identifying feature prior to making an unauthorized dissemination of the data file.

Figure 1A:
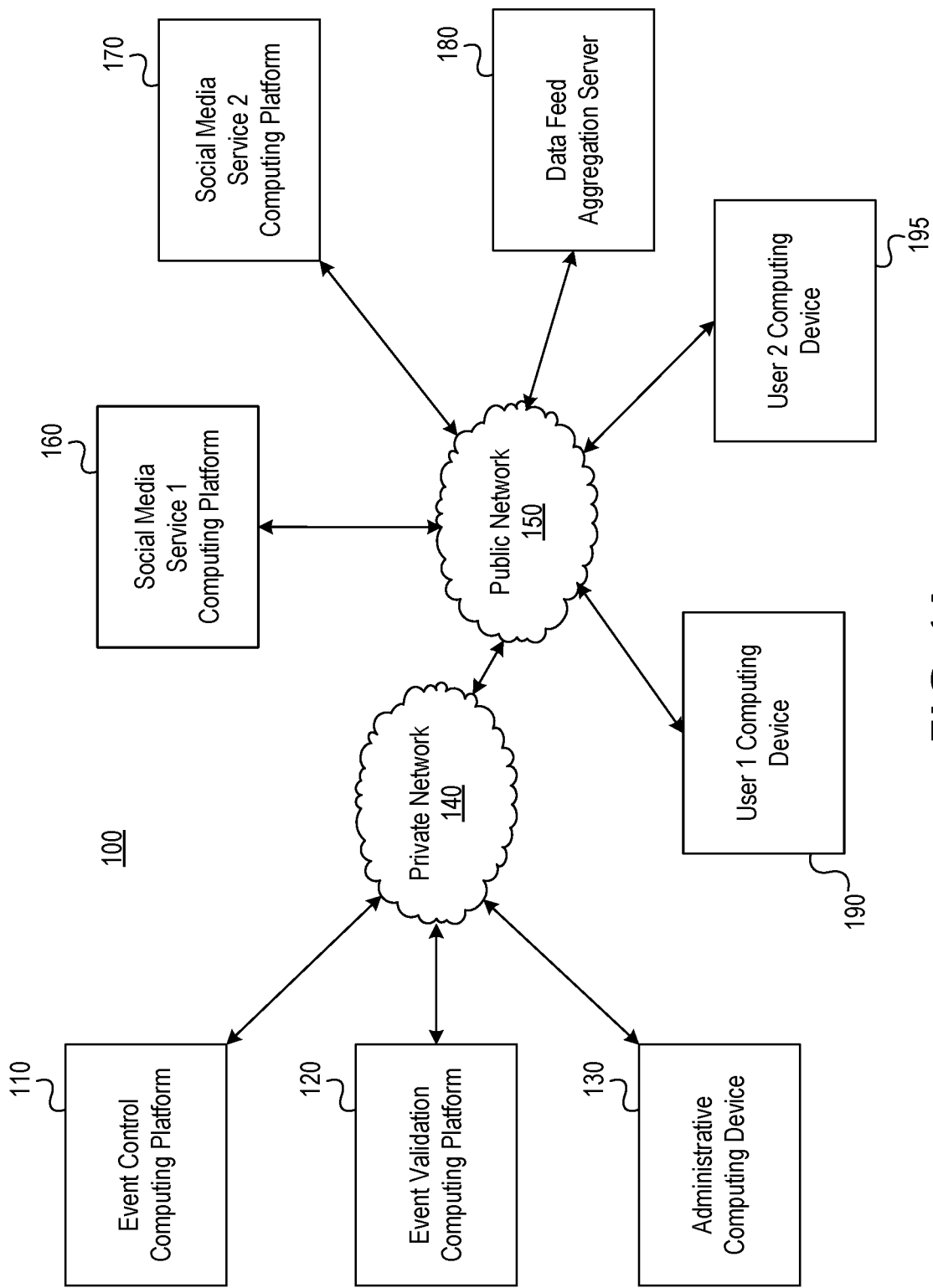
FIGS. 1A and 1B depict an illustrative computing environment for disseminating data files across multiple computing platforms and devices in accordance with one or more example embodiments.
Figure 1B:
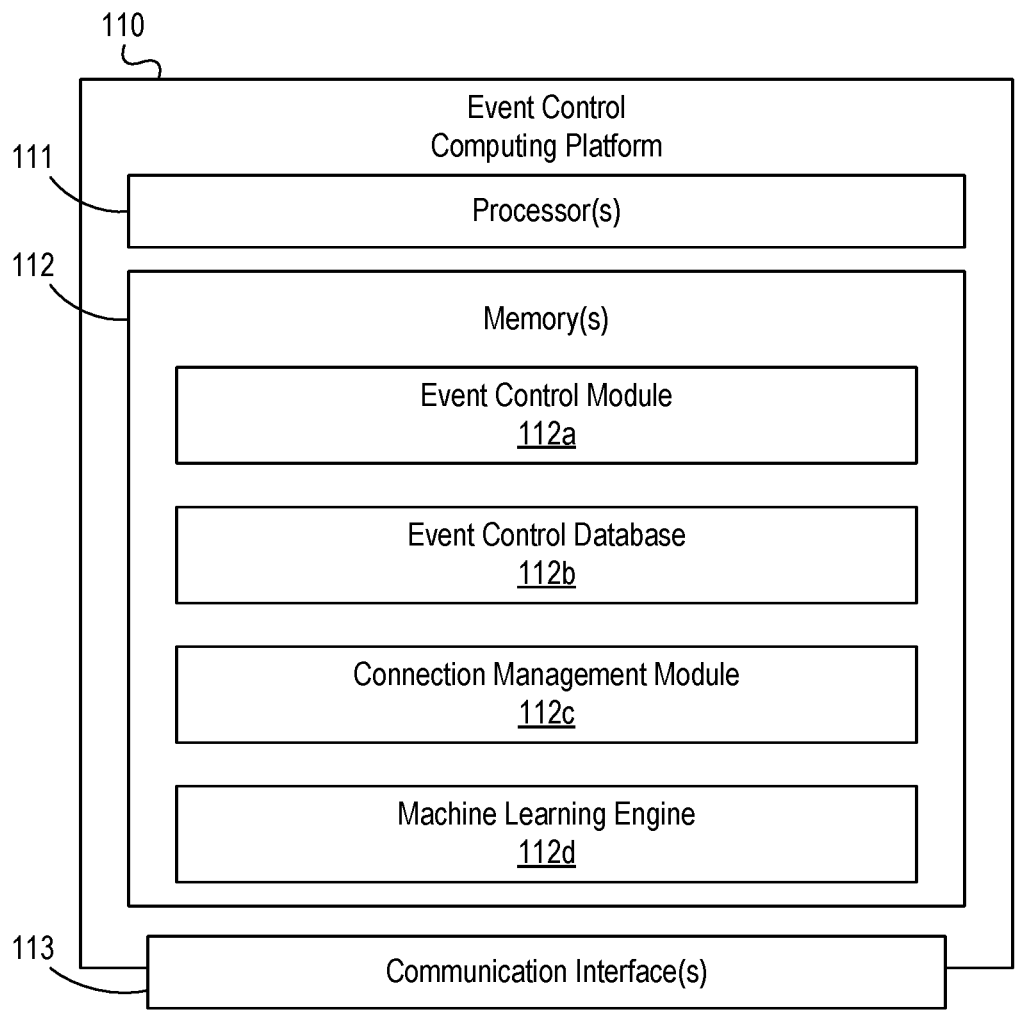

FIGS. 1A and 1B depict an illustrative computing environment for controlling dissemination of data files across multiple computing platforms and devices in accordance with one or more example embodiments. Referring to FIG. 1A, computing environment 100 may include one or more computer systems, one or more computer networks, and/or other computing infrastructure. For example, computing environment 100 may include an event control computing platform 110, an event validation computing platform 120, an administrative computing device 130, a private network 140, a public network 150, a first social media service computing platform 160, a second social media service computing platform 170, a data feed aggregation server 180, a first user computing device 190, and a second user computing device 195.

As discussed in greater detail below, event control computing platform 110 may include one or more computing devices configured to perform one or more of the functions described herein. For example, event control computing platform 110 may include one or more computers (e.g., laptop computers, desktop computers, servers, server blades, or the like) that are configured to orchestrate event validation operations and event control operations across multiple computer systems and devices in computing environment 100.

Event validation computing platform 120 may include one or more computing devices configured to validate events based on event data received from event control computing platform 110 and/or from other sources. For example, event validation computing platform 120 may receive, from event control computing platform 110 and/or one or more other systems, event information defining one or more data file transfers to be executed in computing environment 100, and event validation computing platform 120 subsequently may authorize and/or otherwise validate the one or more data file transfers to be executed in computing environment 100, so as to allow the transfers to proceed and/or otherwise be executed. In some instances, data file transfers may have been requested by one or more computing devices, such as the first user computing device 190 and/or second user computing device 195, and event validation computing platform 120 may evaluate and/or selectively authorize the requested transfers based on information stored and/or maintained by event validation computing platform 120 (e.g., such as financial account information, account balance information, transaction history information, and/or account rules) and/or based on information received from event control computing platform 110 (e.g., such as user-specific transaction rules, account-specific transaction rules, user-specific trends information, and/or other information) and/or one or more other systems. In some examples, enhanced security measures such as two-factor authentication may be used to reduce the possibility of fraudulent use of the system.

Each of the first user computing device 190 user and the second computing device 195 may be a desktop computer, laptop computer, workstation, or other computing device that is configured to be used by a user. Administrative computing device 130 may be a desktop computer, laptop computer, workstation, or other computing device that is configured to be used by an administrative user, such as a network administrator associated with an organization operating event control computing platform 110 and/or event validation computing platform 120.

Social media service computing platform 160 may include one or more computing devices configured to host a first social media service (which may, e.g., be provided by an organization different from the organization operating event control computing platform 110 and/or event validation computing platform 120). In some instances, social media service computing platform 160 may maintain user profile information for various users of the first social media service, provide user interfaces associated with the first social media service to various user devices (e.g., first user computing device 190, second user computing device 195), and provide activity feed data to other systems and/or devices included in computing environment 100, such as event control computing platform 110, event validation computing platform 120, data feed aggregation server 180, and/or the like. For instance, social media service computing platform 160 may, in some arrangements, provide activity feed data (e.g., such as user-specific image data, user-specific geolocation data, user-specific likes data, and/or other user-specific data) to event control computing platform 110 to enable one or more functions provided by event control computing platform 110.

Social media service computing platform 170 may include one or more computing devices configured to host a second social media service (which may, e.g., be provided by an organization different from the organization operating event control computing platform 110 and/or event validation computing platform 120). Additionally, the second social media service may be different from the first social media service (e.g., the second social media service may be provided by an organization different from the organization providing the first social media service). In some instances, social media service computing platform 170 may maintain user profile information for various users of the second social media service, provide user interfaces associated with the second social media service to various user devices (e.g., first user computing device 190 and/or second user computing device 195), and provide activity feed data to other systems and/or devices included in computing environment 100, such as event control computing platform 110, event validation computing platform 120, data feed aggregation server 180, and/or the like. For instance, social media service computing platform 170 may, in some arrangements, provide activity feed data (e.g., such as user-specific image data, user-specific geolocation data, user-specific likes data, and/or other user-specific data) to event control computing platform 110 to enable one or more functions provided by event control computing platform 110.

Data feed aggregation server 180 may include one or more computing devices configured to aggregate data feeds from various source systems (e.g., social media service computing platform 160, social media service computing platform 170, and/or other sources) and/or communicate data feeds to various destination systems (e.g., event control computing platform 110). In some instances, data feed aggregation server 180 may receive social media activity feed data from various social media platforms (e.g., social media service computing platform 160, social media service computing platform 170), and/or other activity data and/or content from other sources, and data feed aggregation server 180 may aggregate any and/or all of the received data to produce an aggregated data feed. Subsequently, data feed aggregation server 180 may communicate and/or otherwise provide the aggregated data feed to one or more destination systems, such as event control computing platform 110, so as to enable one or more functions provided by event control computing platform 110. In some instances, the aggregated data feed may be communicated by data feed aggregation server 180 to event control computing platform 110 via a secure and/or encrypted communications link established between event control computing platform 110 and data feed aggregation server 180.

Computing environment 100 also may include one or more networks, which may interconnect one or more of event control computing platform 110, event validation computing platform 120, administrative computing device 130, social media service computing platform 160, social media service computing platform 170, data feed aggregation server 180, first user computing device 190, and second user computing device 195. For example, computing environment 100 may include private network 140, which may be owned and/or operated by a specific organization and/or which may interconnect one or more systems and/or other devices associated with the specific organization. For example, event control computing platform 110, event validation computing platform 120, and administrative computing device 130 may be owned and/or operated by a specific organization, such as a financial institution, and private network 140 may interconnect event control computing platform 110, event validation computing platform 120, administrative computing device 130, and one or more other systems and/or devices associated with the organization. Additionally, private network 140 may connect (e.g., via one or more firewalls) to one or more external networks not associated with the organization, such as public network 150. Public network 150 may, for instance, include the Internet and may connect various systems and/or devices not associated with the organization operating private network 140. For example, public network 150 may interconnect social media service computing platform 160, social media service computing platform 170, data feed aggregation server 180, user computing devices 190 and 195, and/or various other systems and/or devices.

In some arrangements, the computing devices that make up and/or are included in event control computing platform 110, event validation computing platform 120, administrative computing device 130, social media service computing platform 160, social media service computing platform 170, data feed aggregation server 180, and user computing devices 190 and 195 may be any type of computing device capable of receiving a user interface, receiving input via the user interface, and communicating the received input to one or more other computing devices. For example, the computing devices that make up and/or are included in event control computing platform 110, event validation computing platform 120, administrative computing device 130, social media service computing platform 160, social media service computing platform 170, data feed aggregation server 180, user computing devices 190 and 195 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of the computing devices that make up and/or are included in event control computing platform 110, event validation computing platform 120, administrative computing device 130, social media service computing platform 160, social media service computing platform 170, data feed aggregation server 180, user computing devices 190 and 195 may, in some instances, be special-purpose computing devices configured to perform specific functions.

Referring to FIG. 1B, event control computing platform 110 may include one or more processor(s) 111, memory(s) 112, and communication interface(s) 113. A data bus may interconnect processor(s) 111, memory(s) 112, and communication interface(s) 113. Communication interface(s) 113 may be one or more network interfaces configured to support communications between event control computing platform 110 and one or more networks (e.g., private network 140, public network 150). For example, event control computing platform 110 may establish one or more connections and/or communication links to one or more other systems and/or devices (e.g., event validation computing platform 120, administrative computing device 130, social media service computing platform 160, social media service computing platform 170, data feed aggregation server 180, and user computing devices 190 and 195) via communication interface(s) 113, and event control computing platform 110 may exchange data with the one or more other systems and/or devices (e.g., event validation computing platform 120, administrative computing device 130, social media service computing platform 160, social media service computing platform 170, data feed aggregation server 180, and user computing devices 190 and 195) via communication interface(s) 113 while the one or more connections and/or communication links are established. Memory(s) 112 may include one or more program modules having instructions that when executed by processor(s) 111 cause event control computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of event control computing platform 110 and/or by different computing devices that may form and/or otherwise make up event control computing platform 110. For example, memory(s) 112b may have, store, and/or include an event control module 112a, an event control database 112b, a connection management module 112c, and a machine learning engine 112d. Event control module 112a may have, store, and/or include instructions that direct and/or cause event control computing platform 110 to orchestrate event validation operations and event control operations across multiple computer systems and devices in computing environment 100 and perform other associated functions, as discussed in greater detail below. Event control database 112b may store information used by event control computing platform 110 in orchestrating event validation operations and event control operations across multiple computer systems and devices in computing environment 100 and in performing other associated functions. Connection management module 112c may have, store, and/or include instructions that direct and/or cause event control computing platform 110 to establish one or more connections and/or communication links to one or more other systems and/or devices (e.g., event validation computing platform 120, administrative computing device 130, social media service computing platform 160, social media service computing platform 170, data feed aggregation server 180, and user computing devices 190 and 195) via communication interface(s) 113 and/or to manage and/or otherwise control the exchanging of data with the one or more other systems and/or devices (e.g., event validation computing platform 120, administrative computing device 130, social media service computing platform 160, social media service computing platform 170, data feed aggregation server 180, and user computing devices 190 and 195) via communication interface(s) 113 while the one or more connections and/or communication links are established. Machine learning engine 112d may have, store, and/or include instructions that direct and/or cause event control computing platform 110 to dynamically analyze data collected by event control computing platform 110 based on historical data sets and/or present operations and automatically optimize the functions provided by event control computing platform 110 based on analyzing such data.

Administrative computing device 130 may transmit to the event control computing platform 110 business rules or other information that identifies restricted-access data files and/or criteria used for determining whether a data file may contain restricted-access content. Social media service computing platform(s) 160 and/or 170 also may transmit to the event control computing platform 110 additional information, such as by identifying trends of possible interest to the user network. The data feed aggregation server 180 and/or machine learning engine 112d may aggregate the various incoming information, and a machine learning dataset optionally may be used to refine the criteria used for aggregating the incoming information. In some aspects, the event control computing platform 110 may utilize machine learning to improve functionality of the system. For example, the event control computing platform 110 may receive from administrative computing device 130 (e.g., a single time or by periodic updates) business rules to guide the determination of whether a particular data file should be embedded with a unique identifying feature. The event control computing platform 110 may use a combination of business rules and a historical examination of data files, for example, to assess whether a data file contains sensitive information so as to warrant the enhanced security measures described herein. In some examples, a combination of tagging and machine learning may be used. For example, some data files may be tagged (e.g., by the author, administrator, or other individual within a business organization) as restricted-access, and other data files that are not tagged as restricted-access may be evaluated by the event control computing platform 110 to determine whether the data file nonetheless contains sensitive information. Business rules may include criteria for guiding this determination by the event control computing platform 110, including how conservatively or aggressively that data files should be designated as restricted-access.

Machine learning also may be used to assign reliability ratings to users, such as the reliability of a user in maintaining confidentiality of sensitive data files. For example, if a user is found to disseminate sensitive information without authorization, the user may be assigned a negative reliability rating. Depending on the number and severity of any negative events and whether they are satisfactorily resolved, the event control computing platform 110 may impose restrictions on the offending user. In severe cases, the event control computing platform 110 may preclude the offending user from further receiving any restricted-access data files. In less severe cases, the event control computing platform 110 may cause a rating or warning to be displayed on other user computing devices whenever the offending user requests access to sensitive information, or issue a private warning to the offending user. The event control computing platform 110 likewise may receive positive feedback from user interfaces, for example when the user displays a history of reliably maintaining confidentiality of data files. The event control computing platform 110 may use any positive feedback received to offset negative feedback and/or to cause a favorable rating to be displayed on other user computing devices when the user requests access to sensitive information.

Figure 2:
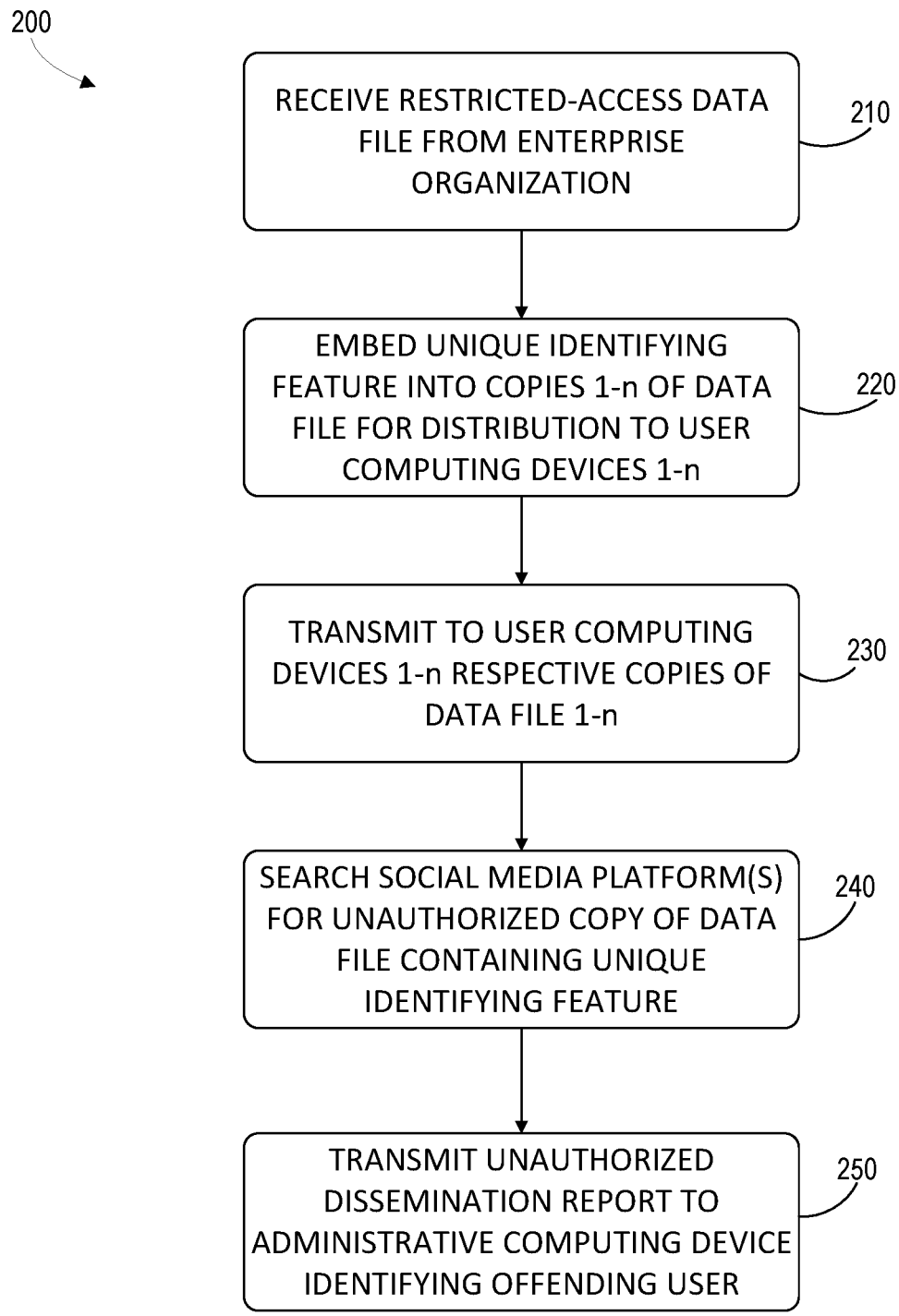
FIG. 2 depicts an illustrative event sequence for searching social media platforms for unauthorized data file distribution in accordance with one or more example embodiments.

FIG. 2 illustrates an example of an event sequence 200 for disseminating data files to user computing devices. At step 210, the event control computing platform 110 receives a restricted-access data file from an enterprise organization. At step 220, the event control computing platform 110 embeds unique identifying features into a plurality of copies of the restricted-access data file for distribution to a corresponding plurality of user computing devices 190, 195. At step 230, the event control computing platform 110 transmits the unique data file copies to the respective user computing devices 190 and 195. At step 240, the data feed aggregation server 180 searches social media computing platform(s) 160 and 170 for an unauthorized copy of the data file containing the unique identifying feature. At step 250, upon discovering an unauthorized copy of the data file on social media computing platform 160 and/or 170, the event control computing platform 110 generates and transmits to the administrative computing device 130 an unauthorized dissemination report identifying the "leaked" data file and the user account associated with the unauthorized data file copy.

Figure 3:
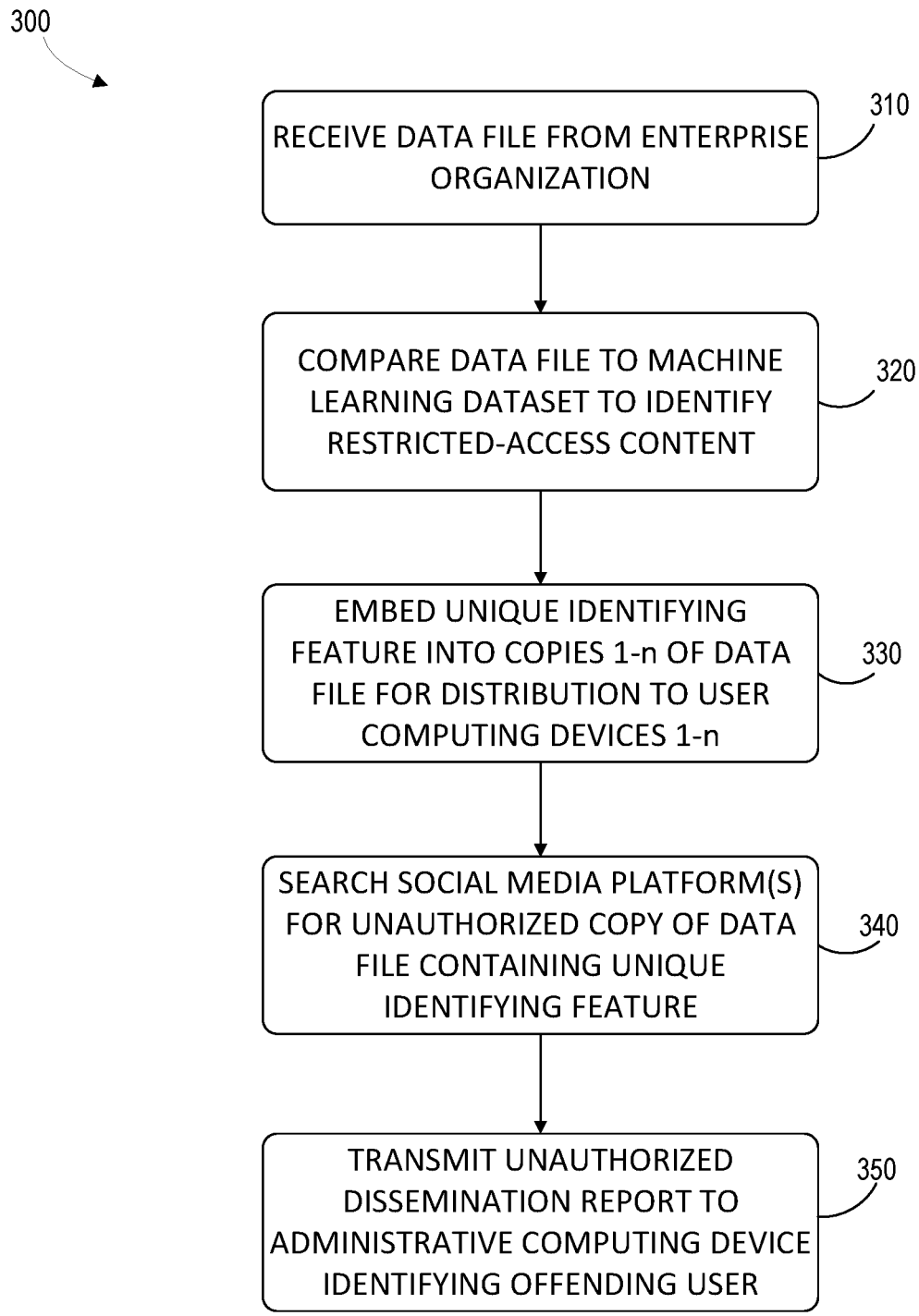
FIG. 3 depicts an illustrative event sequence for creating and distributing user-specific data file copies in accordance with one or more example embodiments.

FIG. 3 illustrates an event sequence 300 in accordance with one or more example embodiments. At step 310, event control computing platform 110 receives a data file from the enterprise organization. At step 320, event control computing platform 110 compares the data file to a machine learning dataset and determines whether the data file contains restricted-access content. At step 330, upon determining that the data file contains restricted-access content, the event control computing platform 110 embeds unique identifying features into a plurality of copies of the restricted-access data file for distribution to a corresponding plurality of user computing devices 190, 195. At step 340, the data feed aggregation server 180 searches social media computing platform(s) 160 and 170 for an unauthorized copy of the data file containing the unique identifying feature. At step 350, upon discovering an unauthorized copy of the data file on social media computing platform 160 and/or 170, the event control computing platform 110 generates and transmits to the administrative computing device 130 an unauthorized dissemination report identifying the "leak" and the user account associated with the unauthorized data file copy.

FIGS. 4A and 4B illustrate examples of graphical user interfaces for administrative computing device 130. FIG. 4A shows an interface 410 that may alert the enterprise organization of the unauthorized dissemination ("leak") of a particular data file. The notification 410 may identify, for example, the offending user account associated with the unauthorized dissemination, the name (or type) of the data file; and/or the social media platform(s) on which the data file was discovered. FIG. 4B illustrates an example of an user interface 420 that may alert the enterprise organization that a particular user's access to confidential information has been blocked as a result of detecting the unauthorized dissemination of a data file by that user.

Figure 5A:
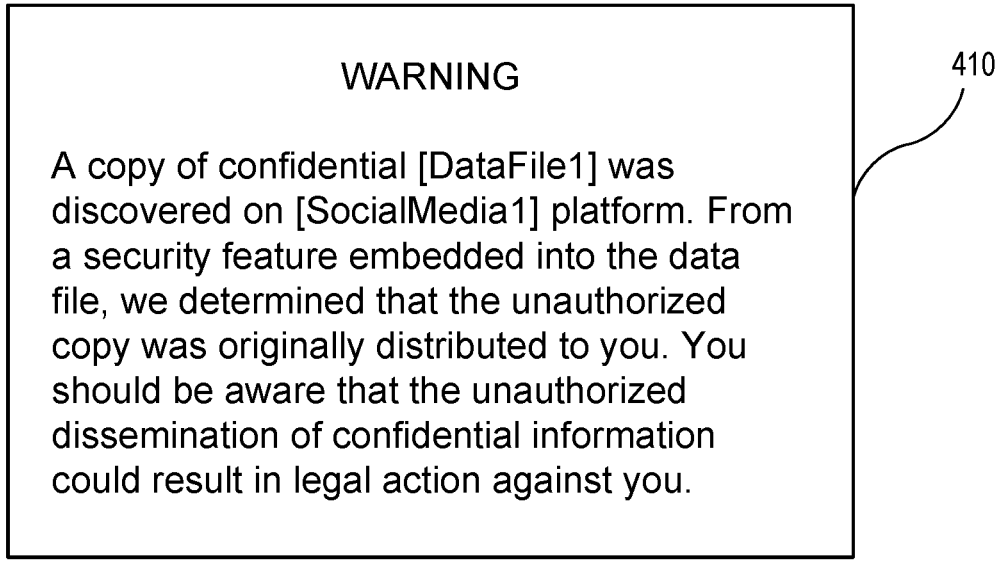
FIGS. 5A and 5B depict example graphical user interfaces for user devices in accordance with one or more example embodiments.
Figure 5B:
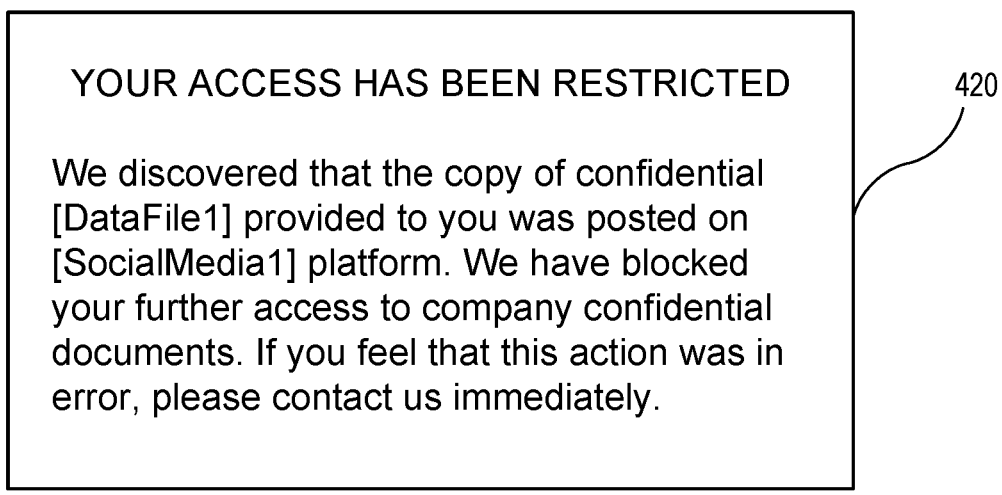

FIGS. 5A and 5B illustrate examples of graphical user interfaces for user devices. FIG. 5A shows a user interface 510 that warns a user that he or she has been linked to the unauthorized dissemination of a data file. A user who does not have a prior history with the enterprise organization may be "tested" during a probationary period, for example, by providing the user with a data file containing restricted-access (though less sensitive) content. If the user is found to have disseminated the data file on social media, he or she may receive a warning (such as interface 510) so that the user becomes aware that data files which are leaked on social media platforms can be traced back to him or her, as a disincentive toward any further unauthorized disclosures. FIG. 5B shows an example of a user interface 520 that alerts a user that his or her access to certain information has been restricted. A user's access may be restricted based on business rules, such as upon committing a second infraction or if any infraction is deemed serious based on pre-established criteria and/or machine learning.

The particular user interfaces shown in FIGS. 4 and 5 are merely illustrative and may be customized depending on user preferences as well as the type of device being used. For example, user interfaces on a smartphone or other telephone-enabled device may include an option to call another entity associated with the computing platform, e.g., other user(s) and/or administrator(s). User interfaces may include other desired functionality, such as an option to send a message to other user(s) or administrator(s).

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
a processor; and
memory storing computer-readable instructions that, when executed by the processor, cause the computing platform to:
determine, based on a machine learning dataset, whether a data file contains restricted-access information, wherein the data file is for distribution to a plurality of user accounts;
embed, based on restricted-access information in the data file, a unique identifying feature into a first copy of the data file, wherein the identifying feature is unique to a user account intended to receive the first copy of the data file;
monitor a plurality of social media platforms for an indication of unauthorized dissemination of the data file;
determine, based on an identified unauthorized dissemination of the data file, whether an embedded identifying feature within the data file matches the unique identifying feature previously embedded into the first copy the data file previously transmitted to the user account;
adjust a reliability rating assigned to the user account based on a match of the embedded identifying feature and the identifying feature unique to the user account; and
cause display, at an administrative computing device, an indication of an unauthorized dissemination report that identifies the user account.

2. The computing platform of claim 1, wherein the data file comprises one or more images captured on a user computing device and uploaded to the one or more social media platforms.

3. The computing platform of claim 1, wherein the instructions further cause the computing platform to:
receive a restricted-access data file for distribution to each of the plurality of user accounts, wherein each user account of the plurality of user accounts is assigned a reliability rating corresponding to a history of reliably maintaining confidentiality of data files;
embed an identifying feature into a second copy of the restricted-access data file for distribution to a corresponding user account of the plurality of user accounts; and
transmit to each of a plurality of user devices, the second copy of the restricted-access data file containing the identifying feature unique to the corresponding user account.

4. The computing platform of claim 3, wherein the restricted-access data file is tagged as restricted-access.

5. The computing platform of claim 1, wherein the instructions further cause the computing platform to:
transmit to each of a plurality of user devices, a copy of the data file containing the identifying feature unique to a respective user account.

6. The computing platform of claim 1, wherein the instructions further cause the computing platform to:
receive, from an administrative computing device, business rules to guide a determination of whether the data file should be embedded with a unique identifying feature; and
embed, based on an indication that the data file contains restricted-access information, a unique identifying feature into each copy of a plurality of copies of the data file, wherein each copy of the data file corresponds to a unique user account of a plurality of user accounts.

7. The computing platform of claim 1, wherein the unique identifying feature of the data file comprises a font change to one or more characters, one or more changes in spacing between adjacent characters, or one or more changes to spacing between adjacent lines of text.

8. The computing platform of claim 7, wherein the unique identifying feature of the data file is essentially undetectable by a human eye.

9. A method, comprising:
determining, based on a machine learning dataset, whether a data file contains restricted-access information, wherein the data file is for distribution to a plurality of user accounts;
embedding, based on restricted-access information in the data file, a unique identifying feature into a copy of the data file, wherein the identifying feature is unique to a user account intended to receive the copy of the data file;
identifying, based on monitoring of one or more social media platforms, unauthorized dissemination of the data file;
determining, based on an identified unauthorized dissemination of the data file, whether an embedded identifying feature within the data file matches the unique identifying feature previously embedded into the copy the data file previously transmitted to the user account;
adjusting, based on a match of the embedded identifying feature and the identifying feature unique to the user account, a reliability rating of an associated user account; and
causing presentation, by an administrative computing device, of a notification that which identifies at least the user account.

10. The method of claim 9, wherein the data file comprises one or more images captured on a user computing device and uploaded to the one or more social media platforms.

11. The method of claim 9, further comprising:
receiving a restricted-access data file for distribution to a plurality of user accounts, wherein each user account of the plurality of user accounts is assigned a reliability rating corresponding to a history of reliably maintaining confidentiality of data files;
embedding an identifying feature into a copy of the restricted-access data file for distribution to each of the plurality of user accounts; and
transmitting to each of a plurality of user devices, a copy of the restricted-access data file containing the identifying feature unique to a respective user account.

12. The method of claim 11, wherein the restricted-access data file is tagged as restricted-access.

13. The method of claim 9, further comprising:
transmitting to each of a plurality of user devices, a copy of the data file containing a digital watermark unique to a respective user account.

14. The method of claim 9, further comprising:
receiving from an administrative computing device, business rules for identifying restricted-access information;
determining, based on a business rule set and a machine learning data set, that the data file contains restricted-access information; and
embedding a digital watermark corresponding to an intended recipient into a third copy of the data file for distribution; and
sending, to the intended recipient, the third copy of the data file.

15. The method of claim 9, wherein the at least one unique identifying feature of the data file comprises one or more of a font change to one or more characters, one or more changes in spacing between adjacent characters, or one or more changes to spacing between adjacent lines of text.

16. The method of claim 15, wherein the at least one unique identifying feature of the data file is essentially undetectable by human vision.

17. A system comprising:
a first computing device comprising a data repository storing a data file; and
a computing platform, comprising:
at least one processor; and
memory storing computer-readable instructions that, when executed by the at least one processor, cause the computing platform to:
receive, from the first computing device, the data file, wherein the data file is to be distributed to a plurality of user accounts;
assess, based on a machine learning data set, whether the data file contains restricted-access information;
embed, based on a determination that the data file contains restricted-access information, an identifying feature into each copy of a plurality of copies of the data file, wherein the identifying feature is unique to each copy of the plurality of copies of the data file and is unique to a particular user account of the plurality of user accounts;
search, via a network, one or more social media platforms for an indication of unauthorized dissemination of the data file;
correlate, based on an identification of unauthorized dissemination of the data file, at least one unique identifying feature of the data file to that of a first copy of the data file previously transmitted to a corresponding user account, wherein the at least one unique identifying feature of the data file is associated with a recipient of the data file associated with the user account;

adjust a reliability rating associated with the user account based on identified unauthorized dissemination of the data file; and send, to an administrative computing device, an unauthorized dissemination report which, when processed by the administrative computing device causes a notification, which identifies at least the user account, a type of the data file, and a social media platform on which the data file was identified and wherein the notification is displayed on the administrative computing device with an indication that the user account has been blocked as a result of unauthorized dissemination of the data file.

18. The system of claim 17, wherein the computer-readable instructions further cause the computing device to:

receive a restricted-access data file for distribution to a plurality of user accounts, wherein each user account of the plurality of user accounts is assigned a reliability rating corresponding to a history of reliably maintaining confidentiality of data files;

embed an identifying feature into a second copy of the restricted-access data file, wherein the second copy of the data file is for distribution to a user account associated with the identifying feature; and transmit to each of a plurality of user devices, the second copy of the restricted-access data file, wherein each second copy of the restricted-access data file contains the identifying feature unique to a respective user account.

19. The system of claim 17, wherein the computer-readable instructions further cause the computing device to:

transmit to each of a plurality of user devices, a copy of the data file containing the identifying feature unique to its respective user account.

20. The system of claim 17, wherein the computer-readable instructions further cause the computing device to:

receive, from an administrative computing device, business rules for identifying restricted-access information in a data file;

determine, based on a comparison of the data file to the business rules and a machine learning data set, whether the data file contains restricted-access information;

embed, based on an indication that the data file contains restricted-access information, a digital watermark into a third copy of the data file for distribution to a user account associated with the digital watermark; and send to a user device associated to the user account associated with the digital watermark, the third copy of the data file containing the digital watermark.

* * * * *